(12) United States Patent
Hernández et al.

(10) Patent No.: US 11,281,293 B1
(45) Date of Patent: Mar. 22, 2022

(54) SYSTEMS AND METHODS FOR IMPROVING HANDSTATE REPRESENTATION MODEL ESTIMATES

(71) Applicant: Facebook Technologies, LLC, Menlo Park, CA (US)

(72) Inventors: Carlos Xavier Hernández, New York, NY (US); Daniel Wetmore, Brooklyn, NY (US)

(73) Assignee: Facebook Technologies, LLC, Menlo Park, CA (US)

( * ) Notice: Subject to any disclaimer, the term of this patent is extended or adjusted under 35 U.S.C. 154(b) by 148 days.

(21) Appl. No.: 16/854,668

(22) Filed: Apr. 21, 2020

Related U.S. Application Data

(60) Provisional application No. 62/841,147, filed on Apr. 30, 2019, provisional application No. 62/841,156, filed on Apr. 30, 2019.

(51) Int. Cl.
| | |
|---|---|
| *G06F 3/01* | (2006.01) |
| *G06N 5/04* | (2006.01) |
| *G06F 1/16* | (2006.01) |
| *G06T 5/00* | (2006.01) |
| *G06T 7/73* | (2017.01) |
| *G06T 19/00* | (2011.01) |
| *G06K 9/00* | (2022.01) |

(52) U.S. Cl.
CPC ............ *G06F 3/015* (2013.01); *G06F 1/163* (2013.01); *G06F 3/017* (2013.01); *G06K 9/00355* (2013.01); *G06N 5/04* (2013.01); *G06T 5/002* (2013.01); *G06T 7/75* (2017.01); *G06T 19/006* (2013.01)

(58) Field of Classification Search
CPC ........ A47J 36/321; B25J 11/009; B25J 13/02; B25J 19/02; B25J 3/04; B25J 9/0018; B25J 9/0087; B25J 9/163; B62D 57/032; G05B 19/04; G05B 19/42; G05B 2219/36184; G05B 2219/40116; G05B 2219/40391; G05B 2219/40395; Y10S 901/01; Y10S 901/03; Y10S 901/28
See application file for complete search history.

(56) References Cited

U.S. PATENT DOCUMENTS 9,402,582 B1 * 8/2016 Parviz ................ A61B 5/02055
2020/0142490 A1 * 5/2020 Xiong ..................... G06F 3/011

\* cited by examiner

*Primary Examiner* — Nelson M Rosario
(74) *Attorney, Agent, or Firm* — FisherBroyles, LLP

(57) ABSTRACT

The disclosed systems and methods are generally directed to providing a musculoskeletal representation of a hand. The system comprises one or more neuromuscular sensors configured to record a plurality of neuromuscular signals from a user and at least one computer processor. The computer processor is programmed to provide the plurality of neuromuscular signals as input to one or more trained inference models. The one or more trained inference models may include a smoothing function such as a loss function, such as a total variation loss function, a finite difference loss function, or another suitable loss function, to generate a temporally smooth output based on the processed neuromuscular signals. The computer processor is further programmed to determine the musculoskeletal representation of the hand based on the temporally smooth output. Various other methods, systems, and computer-readable media are also disclosed.

20 Claims, 8 Drawing Sheets

SYSTEMS AND METHODS FOR IMPROVING HANDSTATE REPRESENTATION MODEL ESTIMATES

CROSS REFERENCE TO RELATED APPLICATION

This application claims the benefit of U.S. Provisional Application No. 62/841,147, filed 30 Apr. 2019 and U.S. Provisional Application No. 62/841,156 filed 30 Apr. 2019, the disclosures of each of which are incorporated, in their entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
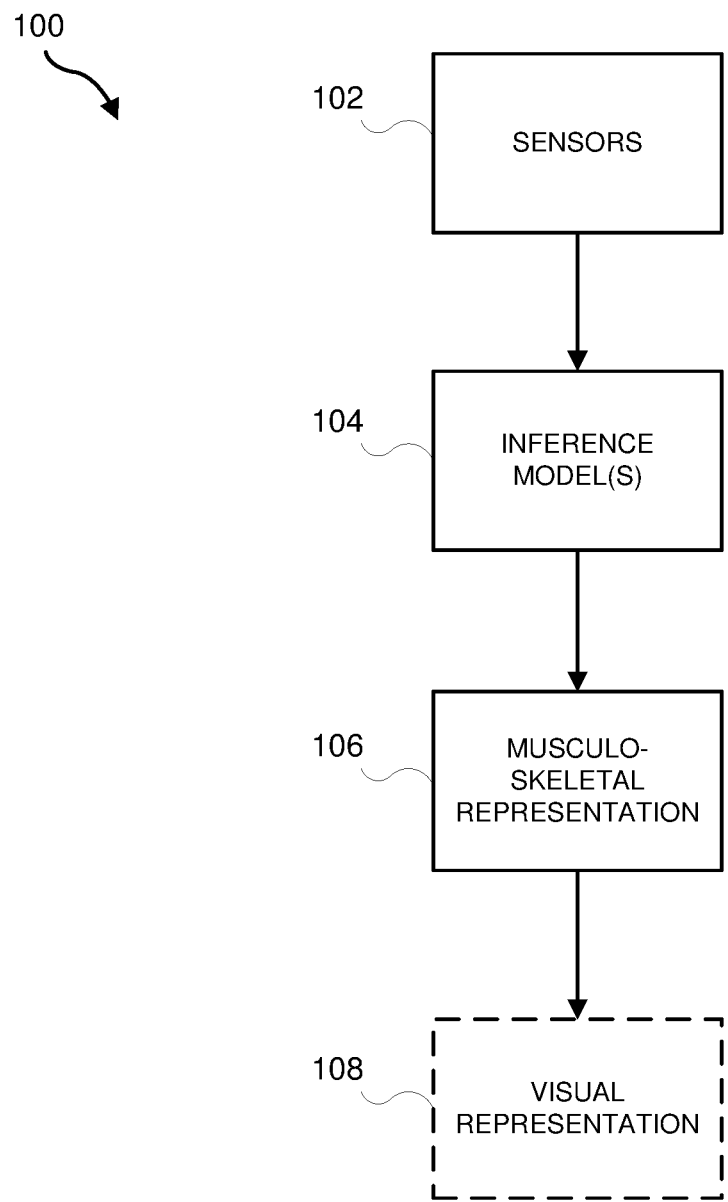
FIG. 1 is a diagram of a computer-based system for generating a musculoskeletal representation based on neuromuscular sensor data.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

In some computer applications that generate musculoskeletal representations of the human body, it may be desirable for the application to provide a more realistic representation of body position, movement, and force. Systems and methods described herein may improve musculoskeletal representations (e.g., representations of the hand) by applying smoothing functions to an inferential model to reduce noise and/or jitter. By reducing noise and/or jitter, these systems and methods may improve user experience in virtual environments that use the musculoskeletal representations for visualizing body parts (e.g., a hand) and for providing movement-based input (e.g., hand gestures).

Accordingly the systems and methods described herein improve the functioning of a computer that processes musculoskeletal representations. Furthermore, these systems and methods improve the functioning of extended reality systems (e.g., a virtual reality (VR) system, an augmented reality (AR) system, or a mixed reality system) that process and/or consume musculoskeletal representation models. These systems and methods therefore represent an advancement in the fields of computing and extended reality.

An application may involve a virtual environment tracking the spatial position of the user's hand and virtually rendering the hand. Although there are camera-based systems used to track human movement, they may fail to realistically track (and render) a user's body part (e.g. hand), at least because such systems may not account for realistic physics, human anatomy (including joint kinematics), and stereotyped and common gestures. Some embodiments described herein may improve systems for tracking (and, e.g., rendering) a part of a user's body (e.g. a hand) in order to more realistically render the position and/or movement of a part of a user's body. More realistic rendering of a part of a user's body (e.g., by more realistically approximating natural kinematics and gestures) may enhance immersion in virtual environments.

Systems and methods described herein may measure and/or model human anatomy using wearable neuromuscular sensors. Data from the neuromuscular sensors may be applied alone or combined with other sources, such as camera data.

In some examples, systems and methods described herein may predict information about the positioning and movements of portions of a user's arm and/or hand represented as a multi-segment articulated rigid body system with joints connecting the multiple segments of the rigid body system. Signals recorded by wearable neuromuscular sensors placed at locations on the user's body are provided as input to an inference model trained to predict estimates of the position (e.g., absolute position, relative position, orientation) and/or forces associated with a plurality of rigid segments in a computer-based musculoskeletal representation associated with a hand when a user performs one or more movements. The position information and/or force information associated with segments of a musculoskeletal representation associated with a hand is referred to herein as a "handstate" of the musculoskeletal representation. As a user performs different movements, a trained inference model may interpret neuromuscular signals recorded by the wearable neuromuscular sensors into position and force estimates (handstate information) that are used to update the musculoskeletal representation. As the neuromuscular signals are continuously recorded, the musculoskeletal representation is updated in real time (or near real time) and a visual representation of a hand (e.g., within a virtual reality environment) is optionally rendered based on the current handstate estimates.

Due to imperfect neuromuscular sensor data and/or imperfectly trained inference models, the estimated handstate output produced by a trained inference model may be noisy and/or jittery. The presence of handstate jitter within a virtual environment may break immersion as a virtual representation of a hand appears unnatural and/or to lack correspondence with the user's actual movements. In addition, where handstate is used for gesture-based input, handstate jitter may interfere with the user's ability to successfully perform gesture-based input.

Accordingly, systems and methods described herein address issues, such as noise or jitter, otherwise observable in the output from a trained inference model. For example, these systems and methods may include a temporal smoothing function within the trained inference model. Additionally or alternatively, these systems and methods may include a temporal smoothing function that post-processes output from the trained inference model. The temporal smoothing function may include any of a variety of functions including, without limitation, a total variation loss function or a finite difference loss function.

The temporal smoothing function may temporally smooth the output of the trained inference model. For example, the temporally smooth output may include one or more predicted joint angles, and a total variation loss function may apply a penalty corresponding to a reduced angular velocity of the one or more predicted joint angles. Applying such a loss penalty may reduce large differences in time-series or sequential output from the trained inference model and help generate more realistic representations (including, e.g., visual representations) of the user's hand or another suitable portion of the user's body.

All or portions of the human musculoskeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, a multi-segment articulated rigid body system is used to model portions of the human musculoskeletal system. However, some segments of the human musculoskeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the hand may be modeled as a multi-segment articulated body with the joints in the wrist and each finger forming the interfaces between the multiple segments in the model. In some embodiments, movements of the segments in the rigid body model can be simulated as an articulated rigid body system in which position (e.g., actual position, relative position, or orientation) information of a segment relative to other segments in the model are predicted using a trained inference model, as described in more detail below.

The portion of the human body approximated by a musculoskeletal representation as described herein as one non-limiting example, is a hand or a combination of a hand with one or more arm segments and the information used to describe a current state of the positional relationships between segments and force relationships for individual segments or combinations of segments in the musculoskeletal representation is referred to herein as the handstate of the musculoskeletal representation. It may be appreciated, however, that the techniques described herein are also applicable to musculoskeletal representations of portions of the body other than the hand including, but not limited to, an arm, a leg, a foot, a torso, a neck, or any combination of the foregoing.

In addition to spatial (e.g., position/orientation) information, some embodiments are configured to predict force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed. In some embodiments, the force information determined as a portion of a current handstate estimate includes one or more of pinching force information, grasping force information, or information about co-contraction forces between muscles represented by the musculoskeletal representation.

FIG. 1 illustrates a system 100 in accordance with some embodiments. The system includes a plurality of sensors 102 configured to record signals resulting from the movement of portions of a human body. Sensors 102 may include autonomous sensors. As used herein, the term "autonomous sensors" refers to sensors configured to measure the movement of body segments without requiring the use of external devices. Examples of external devices used in non-autonomous sensors include, but are not limited to, wearable (e.g. body-mounted) cameras, global positioning systems, or laser scanning systems. In some embodiments, sensors 102 may also include non-autonomous sensors in combination with autonomous sensors. As used herein, the term "non-autonomous sensors" refers to sensors configured to measure the movement of body segments using external devices.

Autonomous sensors may include a plurality of neuromuscular sensors configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, one or more electrical impedance tomography (EIT) sensors, a combination of two or more types of EMG sensors, MMG sensors, SMG sensors, EIT sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) and force information describing the movement may be predicted based on the sensed neuromuscular signals as the user moves over time.

Autonomous sensors may include one or more Inertial Measurement Units (IMUs), which measure a combination of physical aspects of motion, using, for example, an accelerometer, a gyroscope, a magnetometer, or any combination of one or more accelerometers, gyroscopes and magnetometers. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso relative to the sensor (e.g., arms, legs) as the user moves over time.

In embodiments that include at least one IMU and a plurality of neuromuscular sensors, the IMU(s) and neuromuscular sensors may be arranged to detect movement of different parts of the human body. For example, the IMU(s) may be arranged to detect movements of one or more body segments proximal to the torso (e.g., an upper arm), whereas the neuromuscular sensors may be arranged to detect movements of one or more body segments distal to the torso (e.g., a forearm or wrist). Notwithstanding the provided examples, autonomous sensors may be arranged in any suitable way, and embodiments of the technology described herein are not limited based on the particular sensor arrangement. For example, in some embodiments, at least one IMU and a plurality of neuromuscular sensors may be co-located on a body segment to track movements of body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user has an open or closed hand configuration.

Each of the autonomous sensors includes one or more sensing components configured to sense information about a user. In the case of IMUs, the sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, the output of one or more of the sensing components may be processed using hardware signal processing circuitry (e.g., to perform amplification, filtering, and/or rectification). In other embodiments, at least some signal processing of the output of the sensing components may be performed in software. Thus, signal processing of autonomous signals recorded by the autonomous sensors may be performed in hardware, software, or by any suitable combination of hardware and software, as aspects of the technology described herein are not limited in this respect.

In some embodiments, the recorded sensor data may be processed to compute additional derived measurements that are then provided as input to an inference model, as described in more detail below. For example, recorded signals from an IMU sensor may be processed to derive an orientation signal that specifies the orientation of a rigid body segment over time. Autonomous sensors may implement signal processing using components integrated with the sensing components, or at least a portion of the signal processing may be performed by one or more components in communication with, but not directly integrated with the sensing components of the autonomous sensors.

In some embodiments, at least some of the plurality of autonomous sensors are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively, at least some of the autonomous sensors may be arranged on a wearable patch configured to be affixed to a portion of the user's body. In some embodiments, multiple wearable devices, each having one or more IMUs and/or neuromuscular sensors included thereon may be used to predict musculoskeletal position information for movements that involve multiple parts of the body.

In some embodiments, sensors 102 only includes a plurality of neuromuscular sensors (e.g., EMG sensors). In other embodiments, sensors 102 includes a plurality of neuromuscular sensors and at least one "auxiliary" sensor configured to continuously record a plurality of auxiliary signals. Examples of auxiliary sensors include, but are not limited to, other autonomous sensors such as IMU sensors, and non-autonomous sensors such as an imaging device (e.g., a camera), a radiation-based sensor for use with a radiation-generation device (e.g., a laser-scanning device), or other types of sensors such as a heart-rate monitor.

System 100 also includes one or more computer processors (not shown in FIG. 1) programmed to communicate with sensors 102. For example, signals recorded by one or more of the sensors may be provided to the processor(s), which may be programmed to execute one or more machine learning techniques that process signals output by the sensors 102 to train one or more inference models 104, and the trained (or retrained) inference model(s) 104 may be stored for later use in generating a musculoskeletal representation 106, as described in more detail below. In some implementations, the inference model(s) can include one or more statistical models, one or more machine learning models, and/or a combination of one or more statistical model(s) and/or one or more machine learning model(s). Non-limiting examples of inference models that may be used in accordance with some embodiments to predict handstate information based on recorded signals from sensors 102 are discussed in more detail below.

System 100 also optionally includes a display controller configured to display a visual representation 108 (e.g., of a hand). As discussed in more detail below, one or more computer processors may implement one or more trained inference models configured to predict handstate information based, at least in part, on signals recorded by sensors 102. The predicted handstate information is used to update the musculoskeletal representation 106, which is then optionally used to render a visual representation 108 based on the updated musculoskeletal representation incorporating the current handstate information. Real-time reconstruction of the current handstate and subsequent rendering of the visual representation reflecting the current handstate information in the musculoskeletal model may provide visual feedback to the user about the effectiveness of the trained inference model to accurately represent an intended handstate. Not all embodiments of system 100 include components configured to render a visual representation. For example, in some embodiments, handstate estimates output from the trained inference model and a corresponding updated musculoskeletal representation are used to determine a state of a user's hand (e.g., in a virtual reality environment) even though a visual representation based on the updated musculoskeletal representation is not rendered (e.g. for interacting with virtual objects in a virtual environment in the absence of a virtually-rendered hand).

In some embodiments, a computer application configured to simulate a virtual reality environment may be instructed to display a visual representation of the user's hand. Positioning, movement, and/or forces applied by portions of the hand within the virtual reality environment may be displayed based on the output of the trained inference model(s). The visual representation may be dynamically updated based on current reconstructed handstate information as continuous signals are recorded by the sensors 102 and processed by the trained inference model(s) 104 to provide an updated computer-generated representation of the user's movement and/or exerted force that is updated in real-time.

As discussed above, some embodiments are directed to using an inference model for predicting musculoskeletal information based on signals recorded from wearable autonomous sensors. The inference model may be used to predict the musculoskeletal position information without having to place sensors on each segment of the rigid body that is to be represented in the computer-generated musculoskeletal representation. As discussed briefly above, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into inference models used for prediction in accordance with some embodiments.

Additionally or alternatively, the constraints may be learned by the inference model though training based on ground truth data on the position and exerted forces of the hand and wrist in the context of recorded sensor data (e.g., EMG data). Constraints imposed in the construction of the inference model are those set by anatomy and the physics of a user's body, while constraints derived from statistical patterns are those set by human behavior for one or more users from which sensor measurements are measured and used to train the inference model. As is described in more detail below, the constraints may comprise part of the inference model itself being represented by information (e.g., connection weights between nodes) in the model.

As discussed above, some embodiments are directed to using an inference model for predicting handstate information to enable the generation and/or real-time update of a computer-based musculoskeletal representation. The inference model may be used to predict the handstate information based on IMU signals, neuromuscular signals (e.g., EMG, MMG, and SMG signals), external device signals (e.g., camera or laser-scanning signals), or a combination of IMU signals, neuromuscular signals, and external device signals detected as a user performs one or more movements.

Although it is appreciated that inference modeling can be used to predict handstate information, it should be appreciated that the states of other parts of the body may be modeled and predicted using inference models. To this end, there may be other types of devices having one or more sensor types that can be used on other parts of the body to predict their position and any associated forces, movements, or accelerations using, for example, IMU, neuromuscular signals, or other external device signals.

According to one aspect, it is appreciated that the best estimate of the model at any particular time point may not be the correct or most accurate representation. Thus, in a system where sensor outputs are received in real-time, including noise, high variation outputs (e.g., highly variant movement data), or other signals that may drastically change the state of the inference model, it may be beneficial to include in the inference model(s) some type of loss function or penalization term that reduces errors and/or otherwise improves the reliability that the output response models the user's intended movement. In some cases, a loss function may be configured to generate an output response that adheres to realistic physics, anatomy of a user's body part (e.g. a hand), natural joint kinematics, and/or common gestures (i.e. a 'thumbs up' gesture) rather than optimizing for accuracy of an estimate of the movement, position, and/or force of a part of the user's body (e.g., a handstate). In some instances, preset movements may be stored, and it may be determined whether a user's movement corresponds to a particular preset movement (e.g., a 'thumbs up' gesture). In some example implementations, the system may be capable of rendering the preset movement rather than an interpretation of the actual movement (e.g., an estimated handstate). Also, in some cases, a tradeoff may be made between an increased time lag and accuracy in the modeled movement.

Systems described herein many use any of a variety of techniques to modify the inference model to enact one or more loss functions or penalization terms. For instance, the inference model may be trained with one more loss functions described herein. In one implementation, the system may be programmed to train the model with one more loss functions to promote smoothness of the model outputs. For example, the system may be configured to train the inference model with an error function includes the error in the estimates of the time derivatives of joint angles and forces. The error function may include an error in estimates of one or more derivatives of various orders, including first-order derivatives (velocity), second-order derivatives (acceleration), third-order derivatives (jerk), fourth-order derivatives (jounce or snap), or higher-order derivatives (crackle, pop, lock, drop, shot, put, etc.).

In some embodiments, to address, e.g., noise or jitter issues, in the output from the trained inference model, the systems described herein may include a total variation loss function within the trained inference model in order to temporally smooth the output of the trained inference model. For example, the temporally smooth output may include one or more predicted joint angles, and the total variation loss function may apply a penalty corresponding to a reduced angular velocity of the one or more predicted joint angles. Applying such a loss penalty may reduce large differences in time-series or sequential output from the trained inference model and help generate more realistic visual representations of the user's hand or another suitable portion of the user's body.

In some embodiments, the total variation loss function (LTV) includes Equation (1) shown below:

$$L_{TV} = \lambda \Sigma_i |y_i - y_{i-1}| \quad (1)$$

where (i) $\lambda$ is a regularization strength, (ii) $y_i$ is a predicted joint angle at time i, and (iii) $y_{i-1}$ is a predicted joint angle at time (i-1).

In some embodiments, the total variation loss function (LTV) includes Equation (2) shown below:

$$L_{TV} = (\lambda/(N-1))\Sigma_i^{N-1} |y_i - y_{i-1}|^\beta \quad (2)$$

where (i) N is a number of timepoints, (ii) $\lambda$ is a regularization strength, (iii) $y_i$ is a predicted joint angle at time i, (iv) $y_{i-1}$ is a predicted joint angle at time (i-1), and (v) $\beta$ is a sparsity parameter.

In some embodiments, varying the regularization weight, $\lambda$, may improve or diminish the performance of the model with respect to providing temporally smooth output. In some embodiments, the loss function may be varied by using the sparsity parameter, $\beta$, which is the exponent of the loss function and corresponds to a sparsity penalty.

In some embodiments, the systems described herein may include a finite difference loss function within the trained inference model in order to temporally smooth the output of the trained inference model. For example, the temporally smooth output may include one or more predicted joint angles, and the finite difference loss function may apply a penalty corresponding to a reduced second order, or higher, derivative of the one or more predicted joint angles. Such loss penalties may reduce large differences in time-series or sequential output from the trained inference model and help generate more realistic visual representations of the user's hand or another suitable portion of the user's body.

In some embodiments, the finite difference loss function (LnFD) includes Equation (3) shown below:

$$L^n_{FD} = \lambda \Sigma_i |(1-\delta)^n y_i| \quad (3)$$

where (i) n is a derivative order, (ii) $\lambda$ is a regularization strength, (iii) $y_i$ is a predicted joint angle at time i, and (iv) $\delta$ is a shift operator where $\delta y_i = y_{i-1}$.

In some embodiments, the finite difference loss function (LnFD) includes Equation (4) shown below:

$$L^n_{FD} = \lambda \Sigma_i |(1-\delta)^n y_i| \quad (4)$$

where (i) N is a number of timepoints, (ii) n is a derivative order, (iii) $\lambda$ is a regularization strength, (iv) $y_i$ is a predicted joint angle at time i, (v) $\delta$ is a shift operator where $\delta y_i = y_{i-1}$, and (vi) $\beta$ is a sparsity parameter.

In some embodiments, varying the regularization weight, $\lambda$, may improve or diminish the performance of the model with respect to providing temporally smooth output. In some embodiments, the loss function may be varied by using the sparsity parameter, $\beta$, which is the exponent of the loss function and corresponds to a sparsity penalty. In some embodiments, the derivative order, n, may be selected according to the desired order of derivative of the joint angles. For example, n=2 may relate to the penalty corresponding to an acceleration of the one or more predicted joint angles. In another example, n=3 may relate to the penalty corresponding to a jerk of the one or more predicted joint angles. In some embodiments, the shift operator, $\delta$, may be used to push the time-series backward in time. For example, where n=2, the expression $(1-\delta)^2 y_i$ may resolve to $(1-2\delta+\delta^2)y_i$, which in turn may yield $y_i - 2y_{i-1} + y_{i-2}$. In another example, where n=3, the expression $(1-\delta)^3 y_i$ may resolve to $(1-3\delta+3\delta^2-\delta^3)y_i$, which in turn may yield $y_i - 3y_{i-1} + 3y_{i-2} - y_{i-3}$.

In some examples, the systems and methods described herein may use multiple different temporal smoothing functions and/or multiple different sets of parameters for a temporal smoothing function for different aspects of the handstate (e.g., for the angles of different joints). For example, these systems and methods may apply the total variation loss function to the wrist and the finite distance loss function to the fingers. In another example, these systems and methods may apply a higher derivative order (e.g., jerk) with the finite distance loss function to the thumb and a relatively lower derivative order (e.g., acceleration) with the finite distance loss function to the pinky finger. In some examples, the systems described herein may determine that a particular temporal smoothing function and/or a particular parameterization of the function results in more accurate smoothed output. These systems may apply a particular function and/or parameterization for a particular aspect of the handstate in any of a variety of ways. For example, smoothing functions and parameterizations may be applied to the various joints of a hand based on observed performance across a group of users. Additionally or alternatively, smoothing functions and parameterizations may be applied to the various joints of a hand based on feedback from a user (e.g., allowing the user to test multiple configurations and allowing the user to select a preferred configuration; receiving feedback from a user that the quality of a handstate representation is poor (overall or for a particular joint) and modifying the smoothing function configuration in response; performing tests with a user that prompt the user to produce a handstate representation under various smoothing functions and parameterizations and selecting a smoothing function with parameterization that results in the user producing the handstate representation that is most faithful to the prompt; etc.).

In some embodiments, the system determines position information of a spatial relationship between connected segments of the musculoskeletal representation. Further, the system determines forces exerted by the musculoskeletal representation. Collectively, the position information and/or force information is referred to as a handstate of the musculoskeletal model. The system determines the musculoskeletal representation based on the position information and determined force.

In some embodiments, the smoothed output may be used to determine the musculoskeletal representation which can be then used to render, for example, a visual representation based on the updated musculoskeletal representation that incorporates the current handstate information or may otherwise be used as a control input for one or more systems. Such a visual representation may be shown, for example, within a virtual reality environment. In other embodiments, the output may be used to control one or more systems such as a robotic system that is responsive to handstate information. In such systems, it may be useful to provide a model with smoothing effect that restricts outputs responsive to situational outputs that provide inaccurate representations.

In some embodiments, adjustment of one or more parameters of the loss function of the model may be performed responsive to one or more control inputs. For example, it is appreciated that the trained model may record its own measure of accuracy which can be used as control input for adjusting one or more parameters of the loss function of the model. In some embodiments, the system may receive an estimate of an accuracy of the inference model which may be used as a control function for adjusting of one or more parameters of the loss function of the model. For example, an accuracy of the inference model may comprise a likelihood or confidence metric. Further, the system may determine quality metrics associated with incoming neuromuscular data received from neuromuscular sensors, IMUs, or other external sensors. In some embodiments, the system may balance smoothness and error minimization—that is, the system may perform in an adjusted response mode that makes the model less susceptible to input changes yet may not necessarily accurately reflect the current state of the body part. Responsive to these estimates and/or determined quality metrics, the system may alter one or more parameters of the loss function to temporally smooth an output of the model. Such a temporally smoothed output from the model may be provided as a control input to another system and/or rendered such as by a visualization (e.g., a virtual representation, including a virtual reality (VR) environment, an augmented reality (AR) environment, or a mixed environment).

In other embodiments, the model may be responsive to external inputs, such as situational inputs provided in a virtual representation. For instance, after a rendering of the model in the VR environment, one or more parameters of the loss function of the model may be controlled responsive to environmental situation information within the VR environment, such as a spatial relationship of the modeled representation (e.g., of a hand) in relation to one or more objects within the virtual reality environment. For instance, a smoothing effect (or a change in a dynamic smoothing effect) can be enforced on the model as the visual representation of the hand approaches an object within the VR environment. For example, a user is more likely to recognize a movement as non-natural or non-smooth if their (virtual or real) body part (e.g. hand) is in proximity to an object (a virtual object in a virtual environment or a real object in a real/augmented environment), so dynamic smoothing based on virtual object proximity to a rendered part of the user's body (e.g. hand) may enhance the user's experience of immersive virtual reality.

Figure 2:
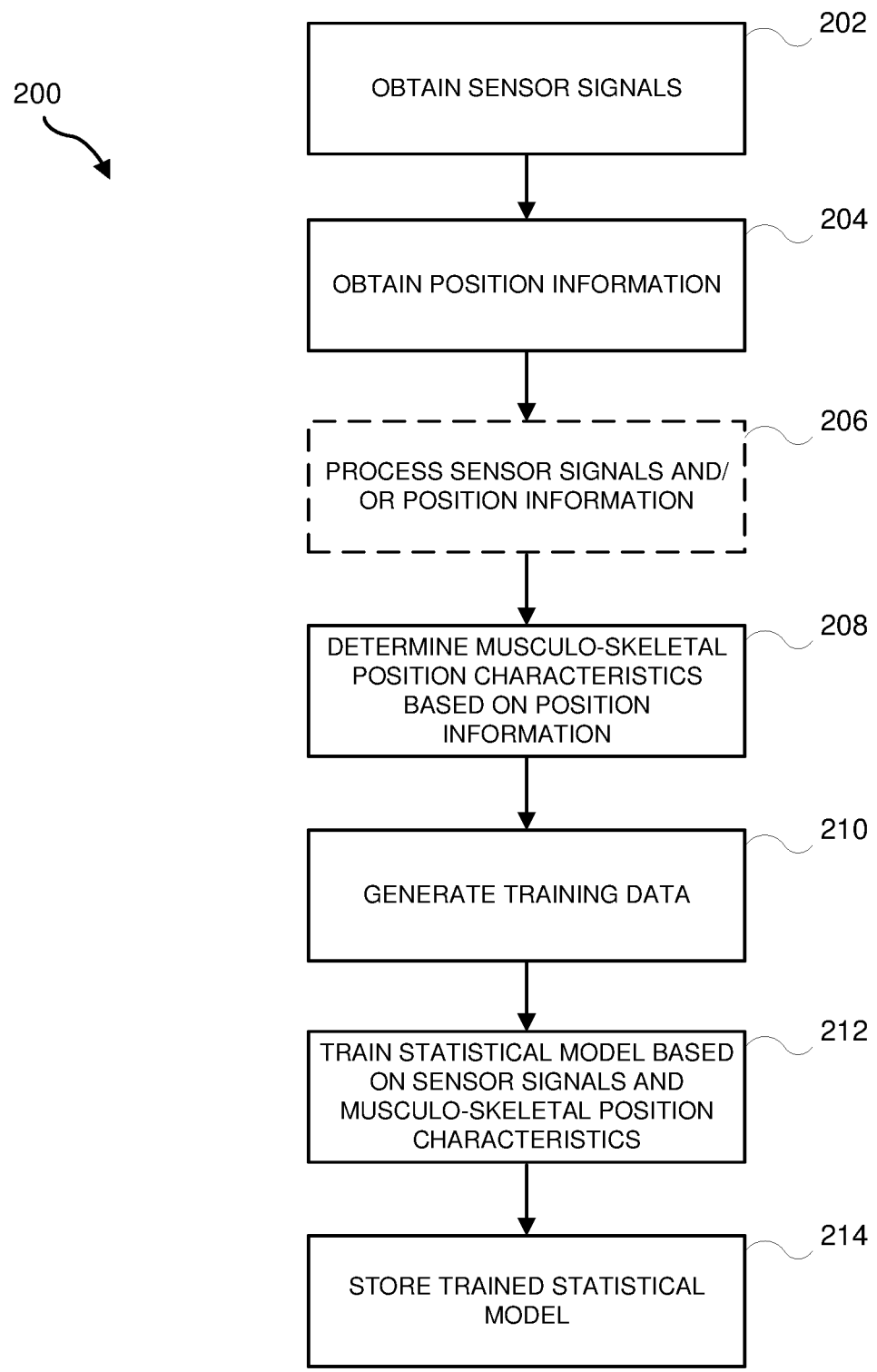
FIG. 2 is a flow diagram of an example method for generating an inference model for predicting musculoskeletal position information using signals recorded from sensors.
Figure 8:
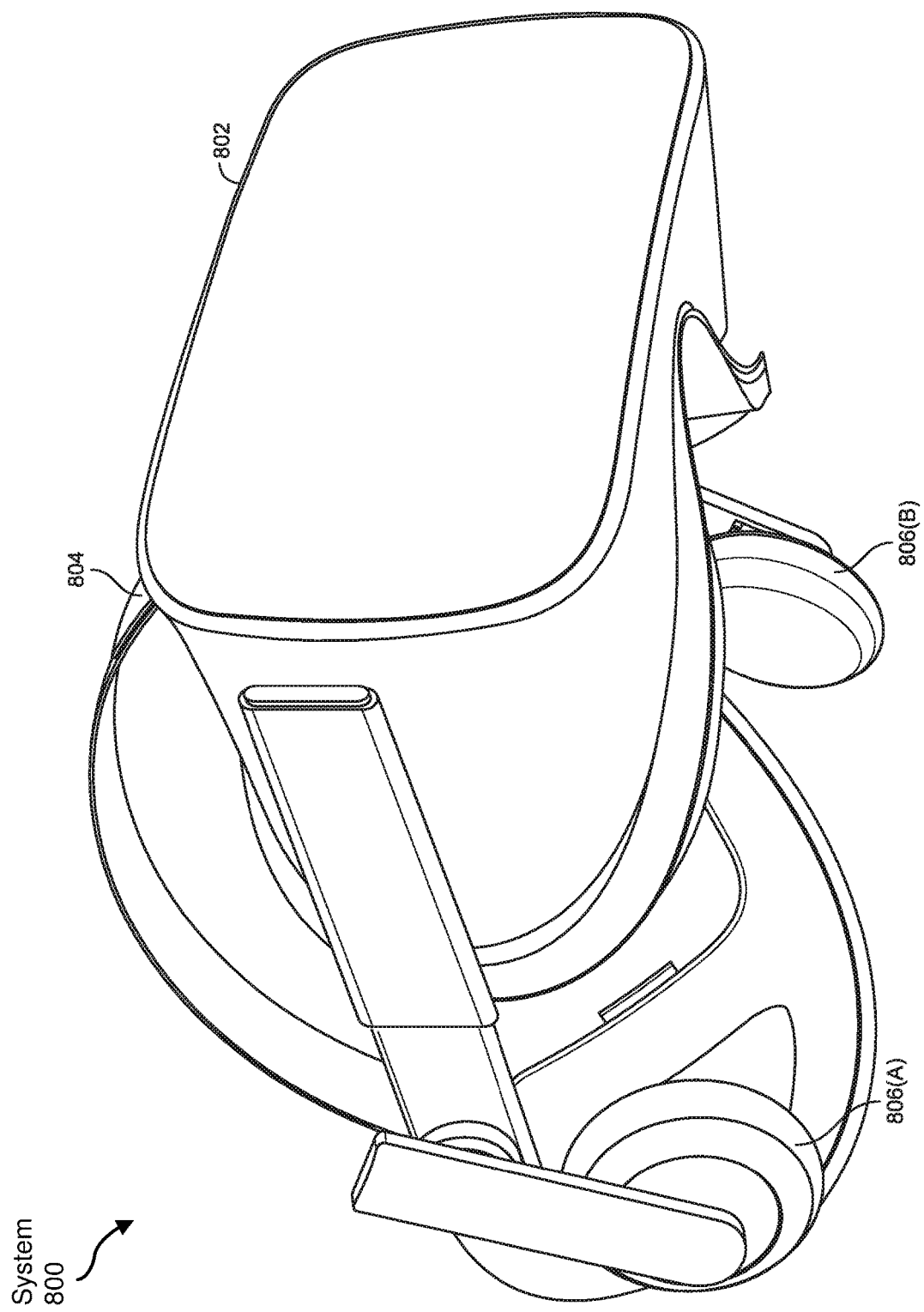
FIG. 8 is an illustration of an exemplary virtual-reality headset that may be used in connection with embodiments of this disclosure.

FIG. 2 illustrates a method 200 for generating (or "training") an inference model using signals recorded from sensors 102. Method 200 may be executed by any suitable computing device(s), as aspects of the technology described herein are not limited in this respect. For example, method 200 may be executed by one or more computer processors described with reference to FIGS. 8A and 8B. As another example, one or more acts of method 200 may be executed using one or more servers (e.g., servers included as a part of a cloud computing environment). For example, at least a portion of step 210 relating to training of an inference model (e.g., a neural network) may be performed using a cloud computing environment.

Method 200 begins at step 202, where a plurality of sensor signals are obtained for one or multiple users performing one or more movements (e.g., typing on a keyboard). In some embodiments, the plurality of sensor signals may be recorded as part of method 200. In other embodiments, the plurality of sensor signals may have been recorded prior to the performance of method 200 and are accessed (rather than recorded) at step 202.

In some embodiments, the plurality of sensor signals may include sensor signals recorded for a single user performing a single movement or multiple movements. The user may be instructed to perform a sequence of movements for a particular task (e.g., opening a door) and sensor signals corresponding to the user's movements may be recorded as the user performs the task he/she was instructed to perform. The sensor signals may be recorded by any suitable number of sensors located in any suitable location(s) to detect the user's movements that are relevant to the task performed. For example, after a user is instructed to perform a task with the fingers of his/her right hand, the sensor signals may be recorded by multiple neuromuscular sensors circumferentially (or otherwise) arranged around the user's lower right arm to detect muscle activity in the lower right arm that give rise to the right hand movements and one or more IMU sensors arranged to predict the joint angle of the user's arm relative to the user's torso. As another example, after a user is instructed to perform a task with his/her leg (e.g., to kick an object), sensor signals may be recorded by multiple neuromuscular sensors circumferentially (or otherwise) arranged around the user's leg to detect muscle activity in the leg that give rise to the movements of the foot and one or more IMU sensors arranged to predict the joint angle of the user's leg relative to the user's torso.

In some embodiments, the sensor signals obtained in step 202 correspond to signals from one type of sensor (e.g., one or more IMU sensors or one or more neuromuscular sensors) and an inference model may be trained based on the sensor signals recorded using the particular type of sensor, resulting in a sensor-type specific trained inference model. For example, the obtained sensor signals may comprise a plurality of EMG sensor signals arranged around the lower arm or wrist of a user and the inference model may be trained to predict musculoskeletal position information for movements of the wrist and/or hand during performance of a task such as grasping and twisting an object such as a doorknob.

In embodiments that provide predictions based on multiple types of sensors (e.g., IMU sensors, EMG sensors, MMG sensors, SMG sensors, EIT sensors), a separate inference model may be trained for each of the types of sensors and the outputs of the sensor-type specific models may be combined to generate a musculoskeletal representation of the user's body. In other embodiments, the sensor signals obtained in step 202 from two or more different types of sensors may be provided to a single inference model that is trained based on the signals recorded from the different types of sensors. In one illustrative implementation, an IMU sensor and a plurality of EMG sensors are arranged on a wearable device configured to be worn around the forearm of a user, and signals recorded by the IMU and EMG sensors are collectively provided as inputs to an inference model, as discussed in more detail below.

In some embodiments, the sensor signals obtained in step 202 are recorded at multiple time points as a user performs one or multiple movements. As a result, the recorded signal for each sensor may include data obtained at each of multiple time points. Assuming that n sensors are arranged to simultaneously measure the user's movement information during performance of a task, the recorded sensor signals for the user may comprise a time series of K n-dimensional vectors $\{x_k | 1 \leq k \leq K\}$ at time points $t_1, t_2, \ldots, t_K$ during performance of the movements.

In some embodiments, a user may be instructed to perform a task multiple times and the sensor signals and position information may be recorded for each of multiple repetitions of the task by the user. In some embodiments, the plurality of sensor signals may include signals recorded for multiple users, each of the multiple users performing the same task one or more times. Each of the multiple users may be instructed to perform the task and sensor signals and position information corresponding to that user's movements may be recorded as the user performs (once or repeatedly) the task he/she was instructed to perform. When sensor signals are collected by multiple users which are combined to generate an inference model, an assumption is that different users employ similar musculoskeletal positions to perform the same movements. Collecting sensor signals and position information from a single user performing the same task repeatedly and/or from multiple users performing the same task one or multiple times facilitates the collection of sufficient training data to generate an inference model that can accurately predict musculoskeletal position information associated with performance of the task.

In some embodiments, a user-independent inference model may be generated based on training data corresponding to the recorded signals from multiple users, and as the system is used by a user, the inference model is trained based on recorded sensor data such that the inference model learns the user-dependent characteristics to refine the prediction capabilities of the system for the particular user.

In some embodiments, the plurality of sensor signals may include signals recorded for a user (or each of multiple users) performing each of multiple tasks one or multiple times. For example, a user may be instructed to perform each of multiple tasks (e.g., grasping an object, pushing an object, and pulling open a door) and signals corresponding to the user's movements may be recorded as the user performs each of the multiple tasks he/she was instructed to perform. Collecting such data may facilitate developing an inference model for predicting musculoskeletal position information associated with multiple different actions that may be taken by the user. For example, training data that incorporates musculoskeletal position information for multiple actions may facilitate generating an inference model for predicting which of multiple possible movements a user may be performing.

As discussed above, the sensor data obtained at step 202 may be obtained by recording sensor signals as each of one or multiple users performs each of one or more tasks one or more multiple times. As the user(s) perform the task(s), position information describing the spatial position of different body segments during performance of the task(s) may be obtained in step 204. In some embodiments, the position information is obtained using one or more external devices or systems that track the position of different points on the body during performance of a task. For example, a motion capture system, a laser scanner, a device to measure mutual magnetic induction, or some other system configured to capture position information may be used. As one non-limiting example, a plurality of position sensors may be placed on segments of the fingers of the right hand and a motion capture system may be used to determine the spatial location of each of the position sensors as the user performs a task such as grasping an object. The sensor data obtained at step 202 may be recorded simultaneously with recording of the position information obtained in step 204. In this example, position information indicating the position of each finger segment over time as the grasping motion is performed is obtained.

Next, method 200 proceeds to step 206, where the sensor signals obtained in step 202 and/or the position information obtained in step 204 are optionally processed. For example, the sensor signals or the position information signals may be processed using amplification, filtering, rectification, or other types of signal processing.

Next, method 200 proceeds to step 208, where musculoskeletal position characteristics are determined based on the position information (as collected in step 204 or as processed in step 206). In some embodiments, rather than using recorded spatial (e.g., x, y, z) coordinates corresponding to the position sensors as training data to train the inference model, a set of derived musculoskeletal position characteristic values are determined based on the recorded position information, and the derived values are used as training data for training the inference model. For example, using information about the constraints between connected pairs of rigid segments in the articulated rigid body model, the position information may be used to determine joint angles that define angles between each connected pair of rigid segments at each of multiple time points during performance of a task. Accordingly, the position information obtained in step 204 may be represented by a vector of n joint angles at each of a plurality of time points, where n is the number of joints or connections between segments in the articulated rigid body model.

Next, method 200 proceeds to step 210, where the time series information obtained at acts 602 and 608 is combined to create training data used for training an inference model at step 210. The obtained data may be combined in any suitable way. In some embodiments, each of the sensor signals obtained at step 202 may be associated with a task or movement within a task corresponding to the musculoskeletal position characteristics (e.g., joint angles) determined based on the positional information recorded in step 204 as the user performed the task or movement. In this way, the sensor signals may be associated with musculoskeletal position characteristics (e.g., joint angles) and the inference model may be trained to predict that the musculoskeletal representation will be characterized by particular musculoskeletal position characteristics between different body segments when particular sensor signals are recorded during performance of a particular task.

In embodiments comprising sensors of different types (e.g., IMU sensors and neuromuscular sensors) configured to simultaneously record different types of movement information during performance of a task, the sensor data for the different types of sensors may be recorded using the same or different sampling rates. When the sensor data is recorded at different sampling rates, at least some of the sensor data may be resampled (e.g., up-sampled or down-sampled) such that all sensor data provided as input to the inference model corresponds to time series data at the same time resolution. Resampling at least some of the sensor data may be performed in any suitable way including, but not limited to using interpolation for upsampling and using decimation for downsampling.

In addition to or as an alternative to resampling at least some of the sensor data when recorded at different sampling rates, some embodiments employ an inference model configured to accept multiple inputs asynchronously. For example, the inference model may be configured to model the distribution of the "missing" values in the input data having a lower sampling rate. Alternatively, the timing of training of the inference model occur asynchronously as input from multiple sensor data measurements becomes available as training data.

Next, method 200 proceeds to step 212, where an inference model for predicting musculoskeletal position information is trained using the training data generated at step 210. The inference model being trained may take as input a sequence of data sets each of the data sets in the sequence comprising an n-dimensional vector of sensor data. The inference model may provide output that indicates, for each of one or more tasks or movements that may be performed by a user, the likelihood that the musculoskeletal representation of the user's body will be characterized by a set of musculoskeletal position characteristics (e.g., a set of joint angles between segments in an articulated multi-segment body model). For example, the inference model may take as input a sequence of vectors $\{x_k | 1 \leq k \leq K\}$ generated using measurements obtained at time points $t_1, t_2, \ldots, t_K$, where the ith component of vector $x_j$ is a value measured by the ith sensor at time $t_j$ and/or derived from the value measured by the ith sensor at time $t_j$. In another non-limiting example, a derived value provided as input to the inference model may comprise features extracted from the data from all or a subset of the sensors at and/or prior to time $t_j$ (e.g., a covariance matrix, a power spectrum, a combination thereof, or any other suitable derived representation). Based on such input, the inference model may provide output indicating, a probability that a musculoskeletal representation of the user's body will be characterized by a set of musculoskeletal position characteristics. As one non-limiting example, the inference model may be trained to predict a set of joint angles for segments in the fingers in the hand over time as a user grasps an object. In this example, the trained inference model may output, a set of predicted joint angles for joints in the hand corresponding to the sensor input.

In some embodiments, the inference model may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some of the embodiments in which the inference model is a neural network, the output layer of the neural network may provide a set of output values corresponding to a respective set of possible musculoskeletal position characteristics (e.g., joint angles). In this way, the neural network may operate as a non-linear regression model configured to predict musculoskeletal position characteristics from raw or pre-processed sensor measurements. It should be appreciated that, in some embodiments, any other suitable non-linear regression model may be used instead of a neural network, as aspects of the technology described herein are not limited in this respect.

In some embodiments, the neural network can be implemented based on a variety of topologies and/or architectures including deep neural networks with fully connected (dense) layers, Long Short-Term Memory (LSTM) layers, convolutional layers, Temporal Convolutional Layers (TCL), or other suitable type of deep neural network topology and/or architecture. The neural network can have different types of output layers including output layers with logistic sigmoid activation functions, hyperbolic tangent activation functions, linear units, rectified linear units, or other suitable type of nonlinear unit. Likewise, the neural network can be configured to represent the probability distribution over n different classes via, for example, a softmax function or include an output layer that provides a parameterized distribution e.g., mean and variance of a Gaussian distribution.

While the use of neural networks is described herein, aspects of the technology described herein are not limited to using neural networks, as other types of inference models may be employed in some embodiments. For example, in some embodiments, the inference model may comprise a hidden Markov model, a Markov switching model with the switching allowing for toggling among different dynamic systems, dynamic Bayesian networks, and/or any other suitable graphical model having a temporal component. Any such inference model may be trained at step 212 using the sensor data obtained at step 202.

As another example, in some embodiments, the inference model may take as input, features derived from the sensor data obtained at step 202. In such embodiments, the inference model may be trained at step 212 using features extracted from the sensor data obtained at step 202. The inference model may be a support vector machine, a Gaussian mixture model, a regression-based classifier, a decision tree classifier, a Bayesian classifier, and/or any other suitable classifier, as aspects of the technology described herein are not limited in this respect. Input features to be provided as training data to the inference model may be derived from the sensor data obtained at step 202 in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the inference model.

In some embodiments, at step 212, values for parameters of the inference model may be estimated from the training data generated at step 210. For example, when the inference model is a neural network, parameters of the neural network (e.g., weights) may be estimated from the training data. In some embodiments, parameters of the inference model may be estimated using gradient descent, stochastic gradient descent, and/or any other suitable iterative optimization technique. In embodiments where the inference model is a recurrent neural network (e.g., an LSTM), the inference model may be trained using stochastic gradient descent and backpropagation through time. The training may employ a cross-entropy loss function and/or any other suitable loss function, as aspects of the technology described herein are not limited in this respect.

Next, method 200 proceeds to step 214, where the trained inference model is stored (e.g., in datastore—not shown). The trained inference model may be stored using any suitable format, as aspects of the technology described herein are not limited in this respect. In this way, the inference model generated during execution of method 200 may be used at a later time, for example, to predict musculoskeletal position information (e.g., joint angles) for a given set of input sensor data, as described below.

In some embodiments, sensor signals are recorded from a plurality of sensors (e.g., arranged on or near the surface of a user's body) that record activity associated with movements of the body during performance of a task. The recorded signals may be optionally processed and provided as input to an inference model trained using one or more techniques described above. In some embodiments that continuously record autonomous signals, the continuously recorded signals (raw or processed) may be continuously or periodically provided as input to the trained inference model for prediction of musculoskeletal position information (e.g., joint angles) for the given set of input sensor data. As discussed above, in some embodiments, the trained inference model is a user-independent model trained based on autonomous sensor and position information measurements from a plurality of users. In other embodiments, the trained model is a user-dependent model trained on data recorded from the individual user from which the data associated with the sensor signals is also acquired.

After the trained inference model receives the sensor data as a set of input parameters, the predicted musculoskeletal position information is output from the trained inference model. As discussed above, in some embodiments, the predicted musculoskeletal position information may comprise a set of musculoskeletal position information values (e.g., a set of joint angles) for a multi-segment articulated rigid body model representing at least a portion of the user's body. In other embodiments, the musculoskeletal position information may comprise a set of probabilities that the user is performing one or more movements from a set of possible movements.

In some embodiments, after musculoskeletal position information is predicted, a computer-based musculoskeletal representation of the user's body is generated based, at least in part, on the musculoskeletal position information output from the trained inference model. The computer-based musculoskeletal representation may be generated in any suitable way. For example, a computer-based musculoskeletal model of the human body may include multiple rigid body segments, each of which corresponds to one or more skeletal structures in the body. For example, the upper arm may be represented by a first rigid body segment, the lower arm may be represented by a second rigid body segment the palm of the hand may be represented by a third rigid body segment, and each of the fingers on the hand may be represented by at least one rigid body segment (e.g., at least fourth-eighth rigid body segments). A set of joint angles between connected rigid body segments in the musculoskeletal model may define the orientation of each of the connected rigid body segments relative to each other and a reference frame, such as the torso of the body. As new sensor data is measured and processed by the inference model to provide new predictions of the musculoskeletal position information (e.g., an updated set of joint angles), the computer-based musculoskeletal representation of the user's body may be updated based on the updated set of joint angles determined based on the output of the inference model. In this way the computer-based musculoskeletal representation is dynamically updated in real-time as sensor data is continuously recorded.

The computer-based musculoskeletal representation may be represented and stored in any suitable way, as embodiments of the technology described herein are not limited with regard to the particular manner in which the representation is stored. Additionally, although referred to herein as a "musculoskeletal" representation, to reflect that muscle activity may be associated with the representation in some embodiments, as discussed in more detail below, it should be appreciated that some musculoskeletal representations used in accordance with some embodiments may correspond to skeletal structures, muscular structures or a combination of skeletal structures and muscular structures in the body.

In some embodiments, direct measurement of neuromuscular activity and/or muscle activity underlying the user's movements may be combined with the generated musculoskeletal representation. Measurements from a plurality of sensors placed at locations on a user's body may be used to create a unified representation of muscle recruitment by superimposing the measurements onto a dynamically posed skeleton. In some embodiments, muscle activity sensed by neuromuscular sensors and/or information derived from the muscle activity (e.g., force information) may be combined with the computer-generated musculoskeletal representation in real time.

Figure 3:
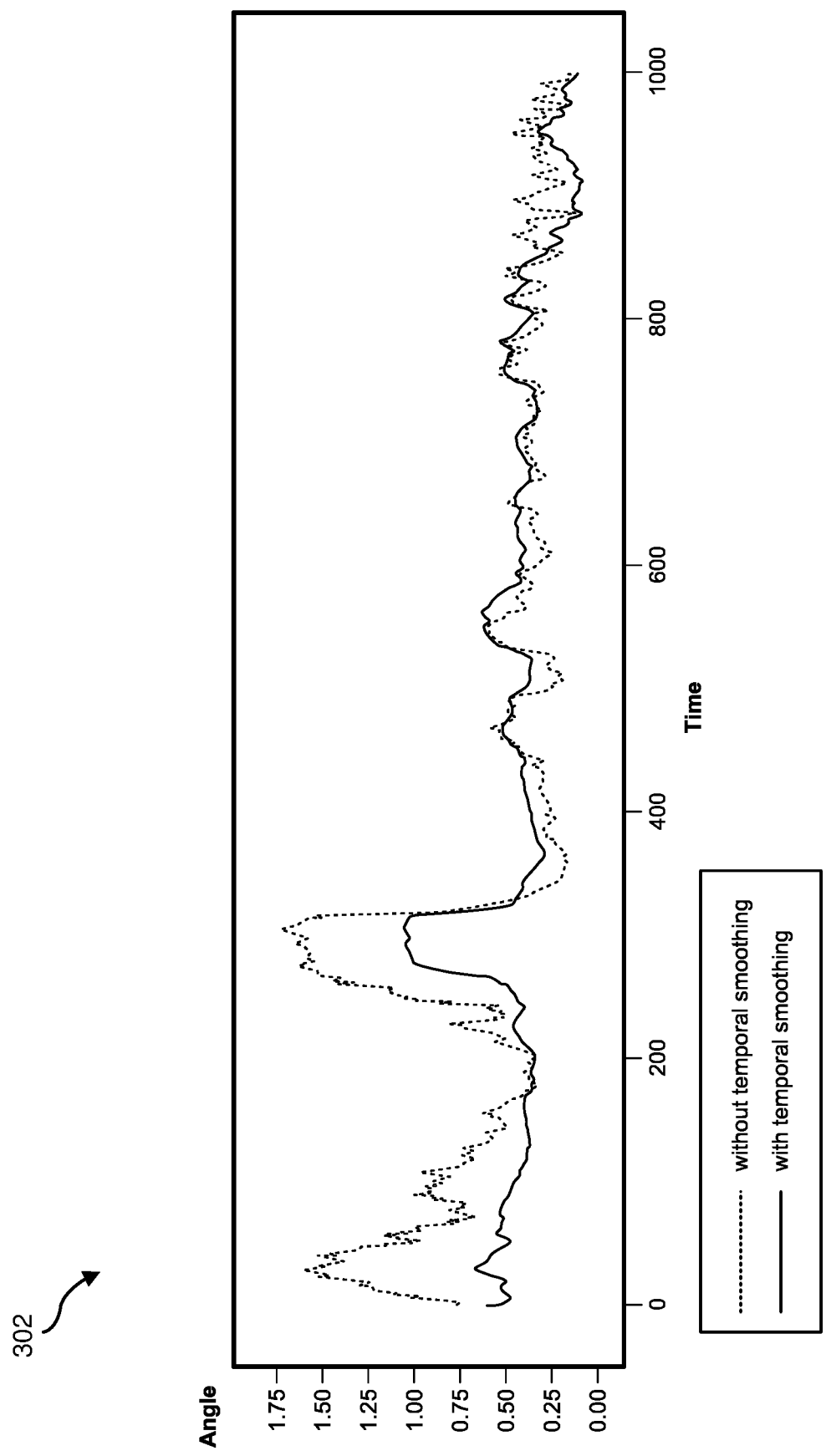
FIG. 3. is an illustration of an example graph comparing an aspect of a musculoskeletal representation with and without applying a temporal smoothing function.

FIG. 3 illustrates an example graph 302 of a computer-generated musculoskeletal representation with and without temporal smoothing as described herein. As shown in FIG. 3, a musculoskeletal representation may be produced by an inferential model using neuromuscular sensor data with or without temporal smoothing. In the example shown in graph 302, without temporal smoothing, the representation of a joint angle (e.g., the metacarpophalangeal joint of the user's right index finger) may change erratically. If visually represented to a user, the user's index finger would appear to be rapidly jittering even if the user were holding the finger substantially still. If the user were attempting gesture-based inputs involving their index finger, an interface system might register inputs based on gestures that the user didn't make and/or might fail to correctly recognize gestures that the user did make. However, with temporal smoothing the musculoskeletal representation may appear natural to the user (e.g., without jitter and/or erratic movements that the user didn't make) and/or gestures performed by the user to a gesture-based input system may be registered with fewer false positives and/or false negatives.

Figure 4A:
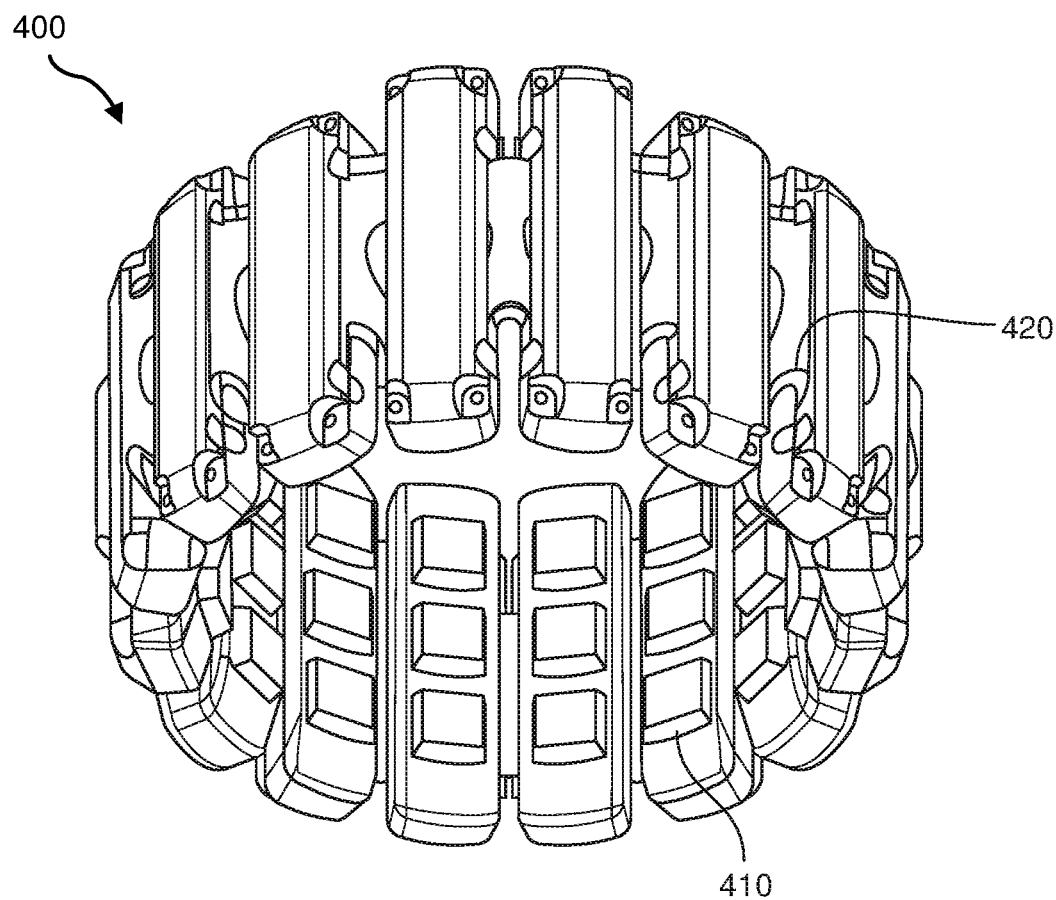
FIG. 4A illustrates a wearable system with sixteen EMG sensors arranged circumferentially around an elastic band configured to be worn around a user's lower arm or wrist.
Figure 4B:
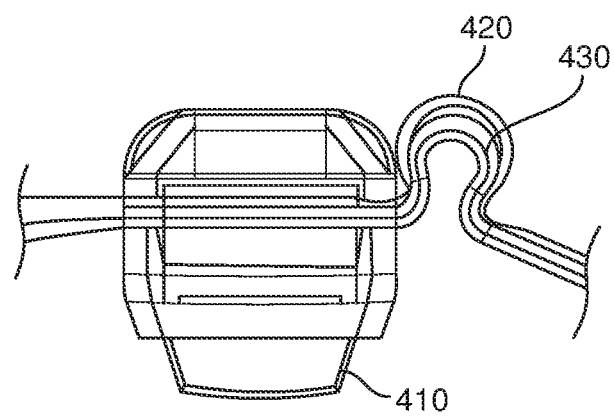
FIG. 4B is a cross-sectional view through one of the sixteen EMG sensors illustrated in FIG. 4A.

FIG. 4A below illustrates a man-machine interface (also referred to herein as an EMG control interface) as a wearable system 400 with sixteen neuromuscular sensors 410 (e.g., EMG sensors) arranged circumferentially around an elastic band 420 configured to be worn around a user's lower arm or wrist. As shown, EMG sensors 410 are arranged circumferentially around elastic band 420. It should be appreciated that any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task. As shown, the sensors may be coupled together using flexible electronics incorporated into the wireless device, FIG. 4B illustrates a cross-sectional view through one of the sensors of the wearable device shown in FIG. 4A.

In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 410 are discussed in more detail below with reference to FIGS. 5A and 5B.

Figure 5A:
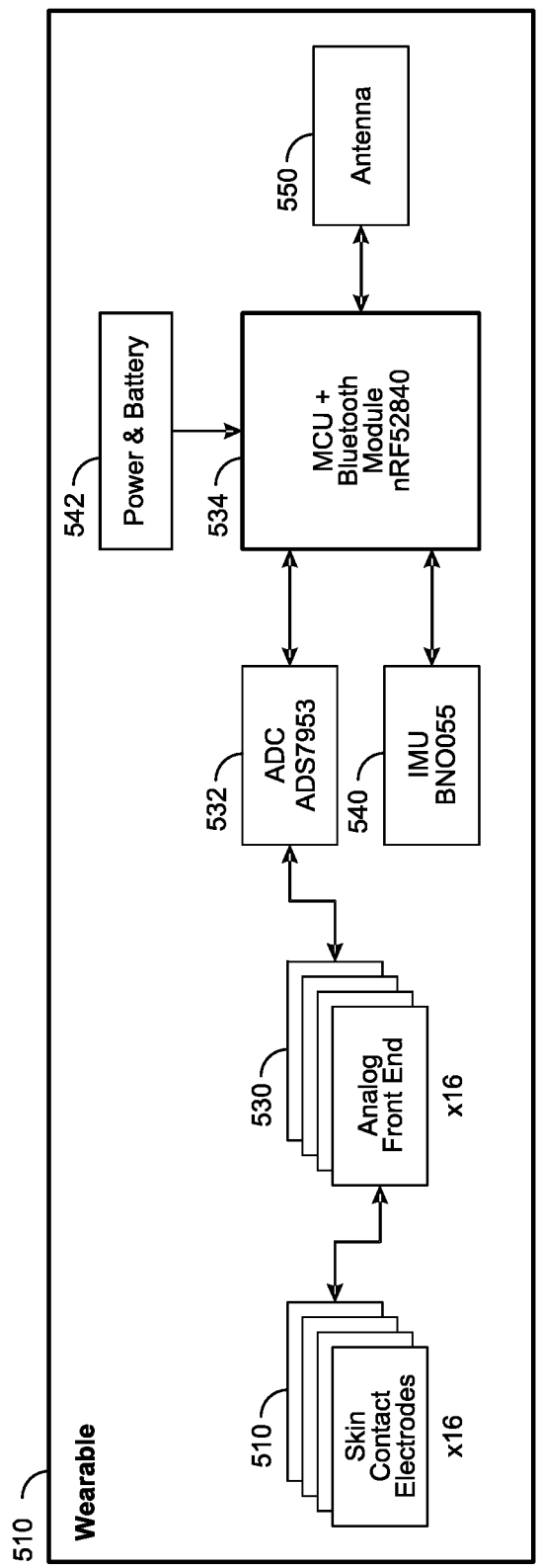
FIGS. 5A and 5B schematically illustrate components of a computer-based system on which some embodiments of the technology described herein are implemented.
Figure 5B:
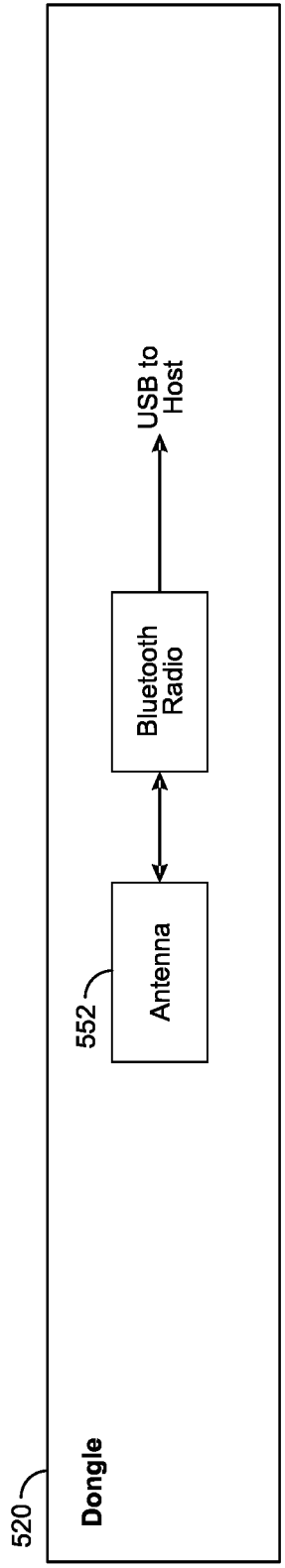

FIGS. 5A and 5B illustrate a schematic diagram with internal components of a wearable system with sixteen EMG sensors. As shown, the wearable system includes a wearable portion 510 (FIG. 5A) and a dongle portion 520 (FIG. 5B) in communication with the wearable portion 510 (e.g., via Bluetooth or another suitable wireless communication technology). As shown in FIG. 5A, the wearable portion 510 includes sensors 410, examples of which are described in connection with FIGS. 4A and 4B. The output of the sensors 410 is provided to analog front end 530 configured to perform analog processing (e.g., amplification, noise reduction, filtering, etc.) on the recorded signals. The processed analog signals are then provided to analog-to-digital converter 532, which converts the analog signals to digital signals that can be processed by one or more computer processors. An example of a computer processor that may be used in accordance with some embodiments is microcontroller (MCU) 534 illustrated in FIG. 5A. As shown, MCU 534 may also include inputs from other sensors (e.g., IMU sensor 540), and power and battery module 542. The output of the processing performed by MCU may be provided to antenna 550 for transmission to dongle portion 520 shown in FIG. 5B.

Dongle portion 520 includes antenna 552 configured to communicate with antenna 550 included as part of wearable portion 510. Communication between antenna 550 and 552 may occur using any suitable wireless technology and protocol, non-limiting examples of which include radiofrequency signaling and Bluetooth. As shown, the signals received by antenna 552 of dongle portion 520 may be provided to a host computer for further processing, display, and/or for effecting control of a particular physical or virtual object or objects.

Although the examples provided with reference to FIGS. 4A-4B and FIGS. 5A-5B are discussed in the context of interfaces with EMG sensors, the techniques described herein for reducing electromagnetic interference can also be implemented in wearable interfaces with other types of sensors including, but not limited to, mechanomyography (MMG) sensors, sonomyography (SMG) sensors, and electrical impedance tomography (EIT) sensors. It should also be understood that the techniques described herein for reducing electromagnetic interference can also be implemented in wearable interfaces that communicate with computer hosts through wires and cables (e.g., USB cables, optical fiber cables).

Figure 6:
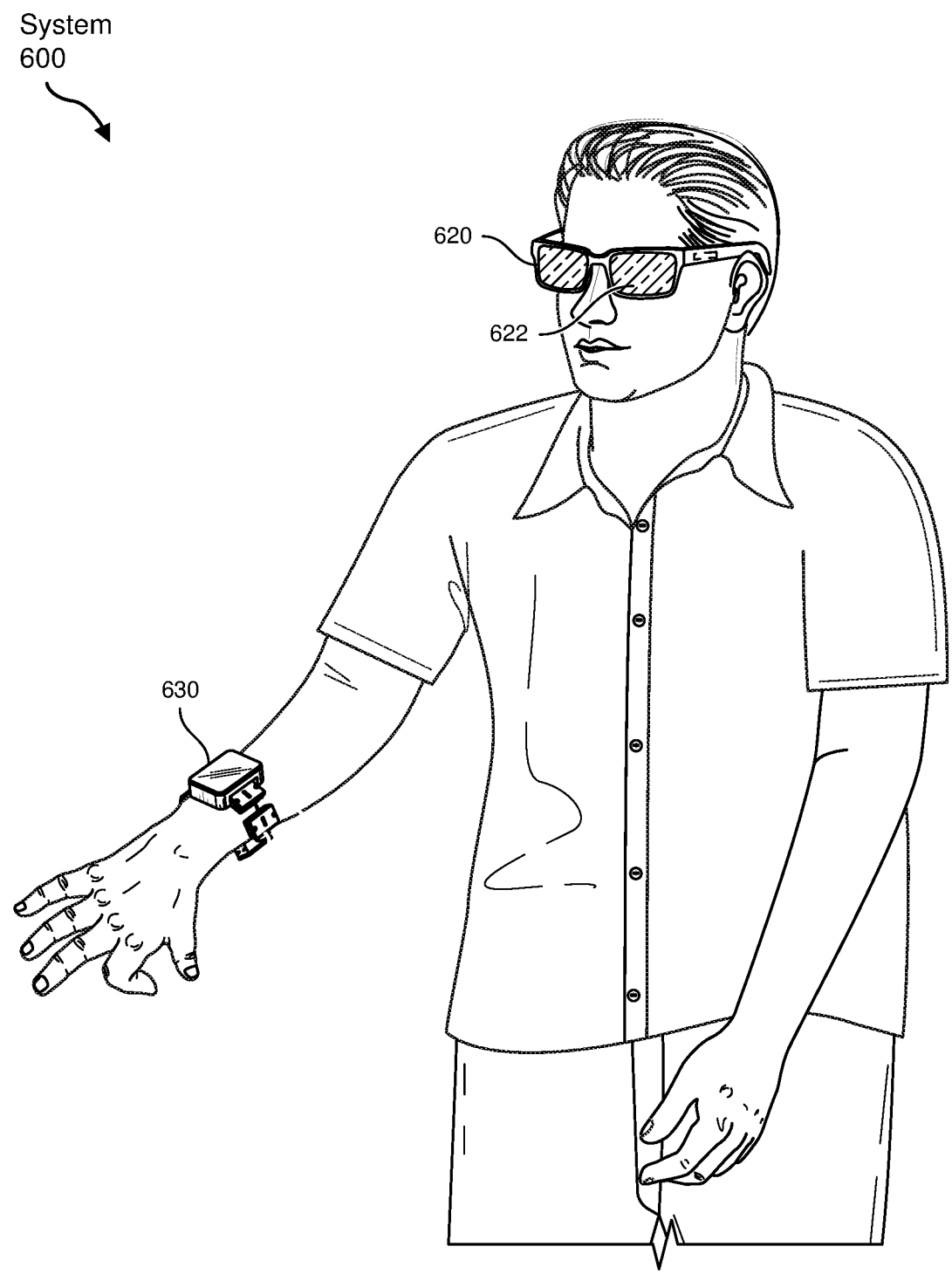
FIG. 6 illustrates an extended reality (XR) system including a headset configured to be worn on a user's head and a wearable control device configured to be worn on the user's arm or wrist, in accordance with some embodiments of the technology described herein.

In some embodiments, the wearable control device may be used in association with a virtual reality (VR), augmented reality (AR) and/or extended reality (XR) systems. In one example system shown in FIG. 6, the XR system 600 comprises a headset 620 (e.g., augmented reality glasses with one or more displays 622) configured to be worn on a user's head, and a wearable control device configured to be worn on the user's arm or wrist. The wearable control device 630 comprises analog signal chain circuitry comprising at least one amplifier configured to amplify analog electrical signals recorded from a body of the user, and an analog-to-digital converter configured to convert the amplified analog electrical signals to digital signals which can be used to control the virtual reality (VR), augmented reality (AR) and/or extended reality (XR) systems.

EXAMPLE EMBODIMENTS

Example 1: A computer-implemented method for control schemes using multiple distinct inferential models may include (1) receiving, one or more neuromuscular sensors that continuously record a plurality of neuromuscular signals from a user, (2) executing a trained inference model representing handstate information, (3) providing as input to a trained inference model, the plurality of neuromuscular signals, where: (i) the trained inference model includes a temporal smoothing function to generate a temporally smooth output from the trained inference model, (ii) the temporally smooth output includes one or more predicted joint angles, and (iii) the temporal smoothing function applies a penalty corresponding to a reduced time derivative of the one or more predicted joint angles, and (4) determining a musculoskeletal representation of a hand of the user based on the temporally smooth output of the trained inference model.

Example 2: The computer-implemented method of Example 1, where the temporal smoothing function includes a total variation loss function.

Example 3: The computer-implemented method of Example 2, where the total variation loss function (LTV) includes $L_{TV}=\lambda\Sigma_i|y_i-y_{i-1}|$, where (i) $\lambda$ is a regularization strength, (ii) $y_i$ is a predicted joint angle at time i, and (iii) $y_{i-1}$ is a predicted joint angle at time i−1.

Example 4: The computer-implemented method of Example 2, where the total variation loss function (LTV) includes $L_{TV}=(\lambda/(N-1))\Sigma_i^{N-1}|y_i-y_{i-1}|^\beta$, where (i) N is a number of timepoints, (ii) $\lambda$ is a regularization strength, (iii) $y_i$ is a predicted joint angle at time i, (iv) $y_{i-1}$ is a predicted joint angle at time i−1, and (v) $\beta$ is a sparsity parameter.

Example 5: The computer-implemented method of Example 1, where the temporal smoothing function includes a finite difference loss function.

Example 6: The computer-implemented method of Example 5, where the finite difference loss function ($L^n_{FD}$) includes $L^n_{FD}=\lambda\Sigma_i|(1-\delta)^n y_i|$, where (i) n is a derivative order, (ii) $\lambda$ is a regularization strength, (iii) $y_i$ is a predicted joint angle at time i, and (iv) $\delta$ is a shift operator where $\delta y_i=y_{i-1}$.

Example 7: The computer-implemented method of Example 6, where (i) n=2 relates to the penalty corresponding to an acceleration of the one or more predicted joint angles; and (ii) n=3 relates to the penalty corresponding to a jerk of the one or more predicted joint angles.

Example 8: The computer-implemented method of Example 5, where the finite difference loss function ($L^n_{FD}$) includes $L^n_{FD}=(\lambda/(N-n))\Sigma_i^{N-n}|(1-\delta)^n y_i|^\beta$, where (i) N is a number of timepoints, (ii) n is a derivative order, (iii) $\lambda$ is a regularization strength, (iv) $y_i$ is a predicted joint angle at time i, (v) $\delta$ is a shift operator where $\delta y_i=y_{i-1}$, and (iv) $\beta$ is a sparsity parameter.

Example 9: The computer-implemented method of Example 1, where the musculoskeletal representation of the hand further includes (i) position information describing a spatial relationship between two or more connected segments of the musculoskeletal representation and (ii) force information describing a force exerted by at least one segment of the musculoskeletal representation.

Example 10: The computer-implemented method of Example 9, where the position information and/or the force information is determined based on the temporally smooth output of the trained inference model.

Example 11: The computer-implemented method of Example 1, further including determining an accuracy of the trained inference model and adjusting at least one parameter of the temporal smoothing function, responsive to the determined accuracy of the trained inference model, to provide an improved temporally smooth output of the trained inference model.

Example 12: The computer-implemented method of Example 1, further including (i) determining a quality of the temporally smoothed output of the trained inference model at a first timepoint, (ii) adjusting at least one parameter of the temporal smoothing function based on the determined quality, and (iii) provide an improved temporally smooth output of the trained inference model at a second timepoint based on the at least one adjusted parameter.

Example 13: The computer-implemented method of Example 1, further including (i) executing an application that provides a virtual representation, (ii) rendering, based on the updated musculoskeletal model of the hand, a visual representation of a hand within the virtual representation, and (iii) adjusting at least one parameter of temporal smoothing function of the trained inference model based, at least in part, on a spatial relationship between the visual representation of the hand and one or more objects within the virtual representation.

Example 14: The computer-implemented method of Example 1, where the one or more objects include a virtual object in a virtual reality environment and/or a real object in an augmented reality environment.

FIG. 29 illustrates a system 2900 in accordance with some embodiments. The system includes a plurality of sensors 2902 configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, one or more electrical impedance tomography (EIT) sensors, a combination of two or more types of EMG sensors, MMG sensors, SMG, and EIT sensors, and/or one or more sensors of any suitable type that configured to detect signals derived from neuromuscular activity. In some embodiments, the plurality of neuromuscular sensors may be used to sense signals derived from muscular activity related to a movement of the part of the body controlled by muscles from which the neuromuscular sensors are arranged to sense the muscle activity. Spatial information (e.g., position and/or orientation information) and force information describing the movement may be predicted based on the sensed neuromuscular signals as the user moves over time or performs one or more gestures.

Sensors 2902 may include one or more Inertial Measurement Units (IMUs), which measure a combination of physical aspects of motion, using, for example, an accelerometer, a gyroscope, a magnetometer, or any combination of one or more accelerometers, gyroscopes and magnetometers. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso relative to the sensor (e.g., arms, legs) as the user moves over time or performs one or more gestures.

In embodiments that include at least one IMU and a plurality of neuromuscular sensors, the IMU(s) and neuromuscular sensors may be arranged to detect movement of different parts of the human body. For example, the IMU(s) may be arranged to detect movements of one or more body segments proximal to the torso (e.g., an upper arm), whereas the neuromuscular sensors may be arranged to detect movements of one or more body segments distal to the torso (e.g., a forearm or wrist). It should be appreciated, however, that sensors may be arranged in any suitable way, and embodiments of the technology described herein are not limited based on the particular sensor arrangement. For example, in some embodiments, at least one IMU and a plurality of neuromuscular sensors may be co-located on a body segment to track movements of body segment using different types of measurements. In one implementation described in more detail below, an IMU sensor and a plurality of EMG sensors are arranged on an armband system configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user is holding an open or closed hand.

Each of the sensors 2902 includes one or more sensing components configured to sense information about a user. In the case of one or more IMU sensors, the sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors) vibration sensors configured to measure skin surface vibrations (e.g., for MMG sensors), acoustic sensing components configured to measure ultrasound signals (e.g., for SMG sensors) arising from muscle activity, and electrical sensing components to measure electrical impedance (e.g., for EIT sensors) from skin.

In some embodiments, at least some of the plurality of sensors 2902 are arranged as a portion of an armband device configured to be worn on or around part of a user's body. For example, in one non-limiting example, an IMU sensor and a plurality of neuromuscular sensors can be arranged circumferentially around an adjustable and/or elastic band such as a wristband or armband configured to be worn around a user's wrist or arm. In some embodiments, multiple armband devices, each having one or more IMUs and/or neuromuscular sensors included thereon may be used to predict musculoskeletal position information for movements, poses, or gestures that involve multiple parts of the body.

In some embodiments, sensors 2902 only include a plurality of neuromuscular sensors (e.g., EMG sensors). In other embodiments, sensors 2902 include a plurality of neuromuscular sensors and at least one "auxiliary" sensor configured to continuously record a plurality of auxiliary signals. Examples of auxiliary sensors include, but are not limited to, other sensors such as IMU sensors, and external sensors such as an imaging device (e.g., a camera), a radiation-based sensor for use with a radiation-generation device (e.g., a laser-scanning device), or other types of sensors such as a heart-rate monitor.

In some embodiments, the output of one or more of the sensing components may be processed using hardware signal processing circuitry (e.g., to perform amplification, filtering, and/or rectification). In other embodiments, at least some signal processing of the output of the sensing components may be performed in software. Thus, signal processing of signals recorded by the sensors may be performed in hardware, software, or by any suitable combination of hardware and software, as aspects of the technology described herein are not limited in this respect.

In some embodiments, the recorded sensor data may be processed to compute additional derived measurements or features that are then provided as input to an inference model, as described in more detail below. For example, recorded sensor data can be used to generate ground truth information to build a user-specific inference model. For another example, recorded signals from an IMU sensor may be processed to derive an orientation signal that specifies the orientation of a rigid body segment over time. Sensors 2902 may implement signal processing using components integrated with the sensing components, or at least a portion of the signal processing may be performed by one or more components in communication with, but not directly integrated with the sensing components of the sensors.

System 2900 also includes one or more computer processors 2904 programmed to communicate with sensors 2902. For example, signals recorded by one or more of the sensors may be provided to the processor(s), which may be programmed to process signals output by the sensors 2902 to train one or more inference models 2906, the trained (or retrained) inference model(s) 2906 may be stored for later use in identifying/classifying gestures and generating control/command signals, as described in more detail below. In some embodiments, the processors 2904 may be programmed to derive one or more features associated with one or more gestures performed by a user and the derived feature(s) may be used to train the one or more inference models 2906. The processors 2904 may be programmed to identify a subsequently performed gesture based on the trained one or more inference models 2906. In some implementations, the processors 2904 may be programmed to utilize the inference model, at least in part, to map an identified gesture to one or more control/command signals.

FIG. 30 illustrates an armband system with an array of neuromuscular sensors (e.g., EMG sensors) arranged circumferentially around an elastic band configured to be worn around a user's lower arm or wrist. As shown, differential neuromuscular sensors are arranged circumferentially and coupled with one or more elastic bands. It should be appreciated that any suitable number of neuromuscular sensors may be used. The number and arrangement of neuromuscular sensors may depend on the particular application for which the armband system is used. For example, a wearable armband or wristband can be used to generate control information for controlling an augmented reality system, a virtual reality system, a robot, controlling a vehicle, scrolling through text, controlling a virtual avatar, or any other suitable control task. As shown the sensors may be coupled together using flexible electronics incorporated into the armband device.

In some embodiments, the output of one or more of the sensors can be optionally processed using hardware signal processing circuitry (e.g., to perform amplification, filtering, and/or rectification). In other embodiments, at least some signal processing of the output of the sensors can be performed in software. Thus, processing of signals sampled by the sensors can be performed in hardware, software, or by any suitable combination of hardware and software, as aspects of the technology described herein are not limited in this respect.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 700 in FIG. 7) or that visually immerses a user in an artificial reality (such as, e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
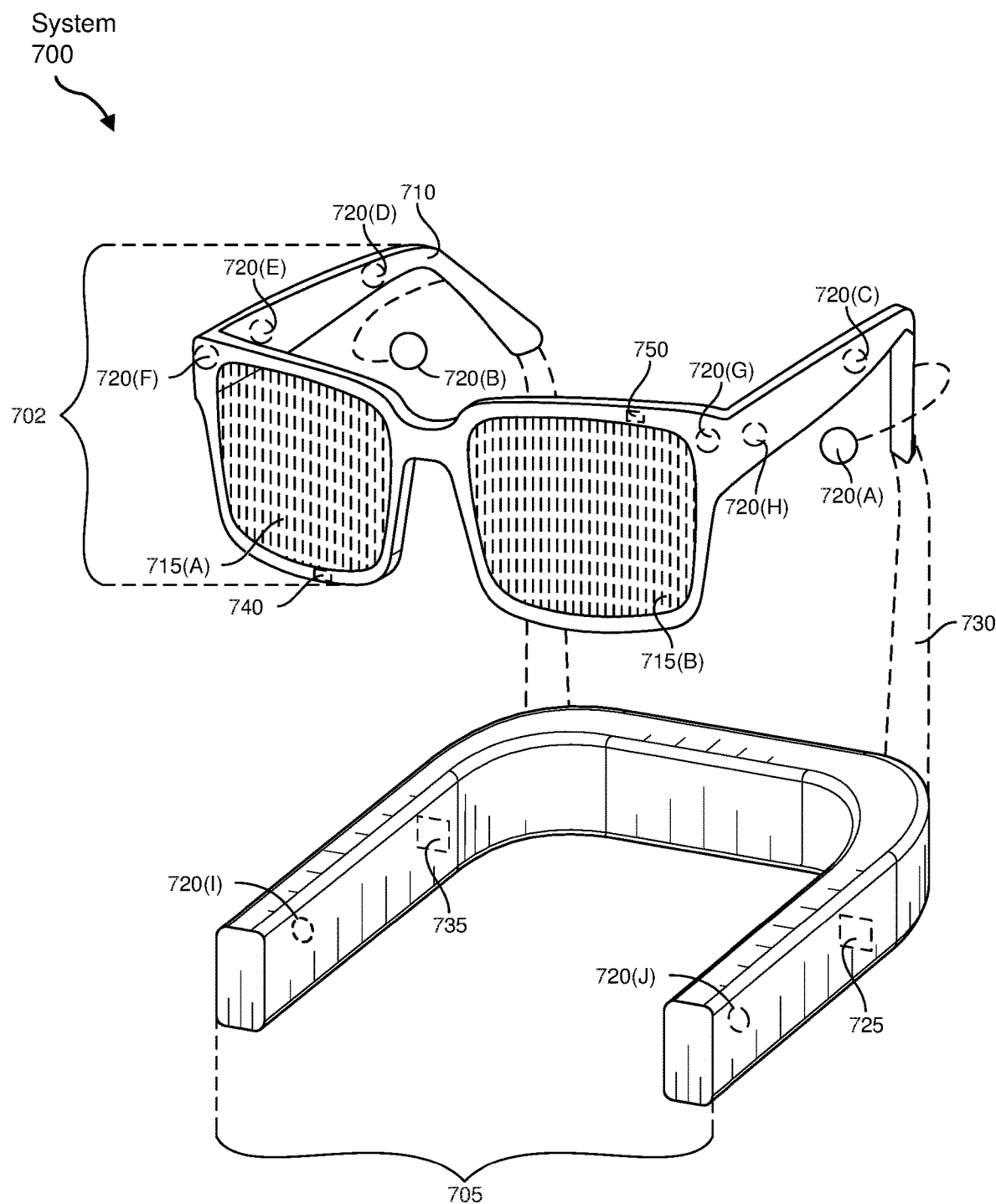
FIG. 7 is an illustration of exemplary augmented-reality glasses that may be used in connection with embodiments of this disclosure.

Turning to FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

In some examples, augmented-reality system 700 may also include a microphone array with a plurality of acoustic transducers 720(A)-720(J), referred to collectively as acoustic transducers 720. Acoustic transducers 720 may represent transducers that detect air pressure variations induced by sound waves. Each acoustic transducer 720 may be configured to detect sound and convert the detected sound into an electronic format (e.g., an analog or digital format). The microphone array in FIG. 8 may include, for example, ten acoustic transducers: 720(A) and 720(B), which may be designed to be placed inside a corresponding ear of the user, acoustic transducers 720(C), 720(D), 720(E), 720(F), 720(G), and 720(H), which may be positioned at various locations on frame 710, and/or acoustic transducers 720(I) and 720(J), which may be positioned on a corresponding neckband 705.

In some embodiments, one or more of acoustic transducers 720(A)-(F) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna, behind the tragus, and/or within the auricle or fossa. Or, there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality device 700 may simulate binaural hearing and capture a 3D stereo sound field around about a user's head. In some embodiments, acoustic transducers 720(A) and 720(B) may be connected to augmented-reality system 700 via a wired connection 730, and in other embodiments acoustic transducers 720(A) and 720(B) may be connected to augmented-reality system 700 via a wireless connection (e.g., a Bluetooth connection). In still other embodiments, acoustic transducers 720(A) and 720(B) may not be used at all in conjunction with augmented-reality system 700.

Acoustic transducers 720 on frame 710 may be positioned in a variety of different ways, including along the length of the temples, across the bridge, above or below display devices 715(A) and 715(B), or some combination thereof. Acoustic transducers 720 may also be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(I) and 720(J)) that are part of the microphone array (or potentially form their own microphone subarray). Neckband 705 may also include a controller 725 and a power source 735.

Acoustic transducers 720(I) and 720(J) of neckband 705 may be configured to detect sound and convert the detected sound into an electronic format (analog or digital). In the embodiment of FIG. 7, acoustic transducers 720(I) and 720(J) may be positioned on neckband 705, thereby increasing the distance between the neckband acoustic transducers 720(I) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720 (D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 700 and/or virtual-reality system 800 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 700 and/or virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" (also referred to herein as simply a "processor") generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive neuromuscular sensor data to be transformed, transform the neuromuscular sensor data, output a result of the transformation to generate a musculoskeletal representation of at least a part of a body, use the result of the transformation to create a visualization of the part of the body in a virtualized environment and/or to provide gesture-based input to a computing device, and store the result of the transformation. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   one or more neuromuscular sensors that record a plurality of neuromuscular signals from a user;
   at least one processor;

memory comprising computer-executable instructions that, when executed by the processor, cause the processor to:
provide the plurality of neuromuscular signals as input to one or more trained inference models;
process the plurality of neuromuscular signals by applying a temporal smoothing function to generate a temporally smooth output for the neuromuscular signals by either: (i) applying the temporal smoothing function to the plurality of neuromuscular signals within the one or more trained inference models, or (ii) applying the temporal smoothing function to the output of the one or more trained inference models; and
determine a musculoskeletal representation of the user's hand based, at least in part, on the temporally smooth output for the processed plurality of neuromuscular signals.

2. The system of claim 1, wherein the computer-executable instructions further cause the processor to:
execute an application that provides a virtual representation;
render, based on the musculoskeletal representation of the user's hand, a visual representation of a hand within the virtual representation; and
adjust at least one parameter of the temporal smoothing function based, at least in part, on a spatial relationship between the visual representation of the user's hand and one or more objects within the virtual representation.

3. The system of claim 1, wherein the computer-executable instructions further cause the processor to:
determine an accuracy of the one or more trained inference models, and
adjust at least one parameter of the temporal smoothing function, responsive to the determined accuracy of the one or more trained inference models, to provide an improved temporally smooth output based on the processed plurality of neuromuscular signals.

4. The system of claim 1, wherein the computer-executable instructions further cause the processor to:
determine a quality of the temporally smoothed output of the one or more trained inference models at a first timepoint;
adjust at least one parameter of the temporal smoothing function based on the determined quality; and
provide an improved temporally smooth output of the one or more trained inference models at a second timepoint based on the at least one adjusted parameter.

5. The system of claim 1, wherein the temporally smooth output includes one or more predicted joint angles.

6. The system of claim 5, wherein the temporal smoothing function applies a penalty corresponding to a reduced time derivative of the one or more predicted joint angles.

7. The system of claim 1, wherein the musculoskeletal representation of the user's hand further includes:
position information describing a spatial relationship between two or more connected segments of the musculoskeletal representation; and
force information describing a force exerted by at least one segment of the musculoskeletal representation.

8. The system of claim 7, wherein the position information and/or the force information is determined based on the temporally smooth output of the one or more trained inference models.

9. The system of claim 1, wherein the temporal smoothing function comprises a total variation loss function.

10. The system of claim 9, wherein the total variation loss function comprises one or more of:
a regularization strength term;
a sum of absolute differences across time between a predicted joint angle and a previously predicted joint angle;
a term for a number of timepoints; and
a sparsity parameter.

11. The system of claim 1, wherein the temporal smoothing function comprises a finite difference loss function.

12. The system of claim 11, wherein the finite difference loss function comprises:
a derivative order term;
a regularization strength term;
a predicted joint angle term; and
a shift operator term.

13. The system of claim 12, wherein:
n=2 relates to a penalty corresponding to an acceleration of the one or more predicted joint angles; and
n=3 relates to a penalty corresponding to a jerk of the one or more predicted joint angles.

14. The system of claim 12, wherein the finite difference loss function further comprises:
a term for a number of timepoints; and
a sparsity parameter.

15. A computer-implemented method comprising:
receiving a plurality of neuromuscular signals from a user from one or more neuromuscular sensors;
executing one or more trained inference models to generate handstate information;
providing the plurality of neuromuscular signals as input to the one or more trained inference models;
processing the plurality of neuromuscular signals by applying a temporal smoothing function to generate a temporally smooth output for the plurality of neuromuscular signals by either: (i) applying the temporal smoothing function to the plurality of neuromuscular signals within the one or more trained inference models, or (ii) applying the temporal smoothing function to the output of the one or more trained inference models; and
determining a musculoskeletal representation of the user's hand based, at least in part, on the temporally smooth output for the processed plurality of neuromuscular signals.

16. The computer-implemented method of claim 15, further comprising:
executing an application that provides a virtual representation;
rendering, based on the musculoskeletal representation of the user's hand, a visual representation of a hand within the virtual representation; and
adjusting at least one parameter of the temporal smoothing function based, at least in part, on a spatial relationship between the visual representation of the user's hand and one or more objects within the virtual representation.

17. The computer-implemented method of claim 15, further comprising:
determining an accuracy of the one or more trained inference models, and
adjusting at least one parameter of the temporal smoothing function, responsive to the determined accuracy of the one or more trained inference models, to provide an improved temporally smooth output based on the processed plurality of neuromuscular signals.

18. The computer-implemented method of claim 15, further comprising:
- determining a quality of the temporally smoothed output at a first timepoint;
- adjusting at least one parameter of the temporal smoothing function based on the determined quality; and
- providing an improved temporally smooth output at a second timepoint based on the at least one adjusted parameter.

19. The computer-implemented method of claim 15, wherein the temporally smooth output includes one or more predicted joint angles.

20. A non-transitory computer-readable medium encoded with a plurality of instructions that, when executed by at least one computer processor, performs a method for providing a musculoskeletal representation of a hand, the method comprising:
- receiving a plurality of neuromuscular signals from a user from one or more neuromuscular sensors;
- executing one or more trained inference models representing handstate information;
- providing the plurality of neuromuscular signals as input to the trained one or more inference models;
- processing the plurality of neuromuscular signals by applying a temporal smoothing function to generate a temporally smooth output for the plurality of neuromuscular signals by either: (i) applying the temporal smoothing function to the plurality of neuromuscular signals within the one or more trained inference models, or (ii) applying the temporal smoothing function to the output of the one or more trained inference models; and
- determining a musculoskeletal representation of the user's hand based on the temporally smooth output for the processed plurality of neuromuscular signals.

* * * * *